(12) United States Patent
Galle et al.

(10) Patent No.: US 7,294,396 B2
(45) Date of Patent: *Nov. 13, 2007

(54) ADHESIVE TAPE HAVING ONE SIDE COATED WITH AN ADHESIVE, AND NO SURFACE TREATMENT ON THE OPPOSITE SIDE

(75) Inventors: Andre Galle, Hamburg (DE); Bernhard Müssig, Seevetal (DE); Stefan Röber, Hamburg (DE); Herbert Sinnen, Pinnenberg (DE); Dieter Wenninger, Singapore (SG)

(73) Assignee: tesa AG, Hamburg (DE)

( * ) Notice: Subject to any disclaimer, the term of this patent is extended or adjusted under 35 U.S.C. 154(b) by 83 days.

This patent is subject to a terminal disclaimer.

(21) Appl. No.: 10/333,874

(22) PCT Filed: Jul. 27, 2001

(86) PCT No.: PCT/EP01/08745

§ 371 (c)(1),
(2), (4) Date: Aug. 11, 2003

(87) PCT Pub. No.: WO02/10304

PCT Pub. Date: Feb. 7, 2002

(65) Prior Publication Data

US 2004/0053023 A1    Mar. 18, 2004

(30) Foreign Application Priority Data

Jul. 27, 2000   (DE) ................................. 100 36 705

(51) Int. Cl.
*B32B 25/08*    (2006.01)
*B32B 7/12*    (2006.01)

(52) U.S. Cl. ...................... 428/332; 428/343; 428/353; 428/354; 428/356; 428/494; 428/910

(58) Field of Classification Search ................ 428/214, 428/343, 353, 354, 356, 332
See application file for complete search history.

(56) References Cited

U.S. PATENT DOCUMENTS

| 4,699,816 | A | * | 10/1987 | Galli ......................... 428/40.6 |
| 6,489,024 | B2 | * | 12/2002 | Griffith et al. .............. 428/356 |
| 6,565,703 | B2 | * | 5/2003 | Wenninger et al. ......... 156/338 |
| 6,777,490 | B2 | * | 8/2004 | Mussig et al. ................ 525/55 |

FOREIGN PATENT DOCUMENTS

| DE | 38 42 344 | | 6/1990 |
| DE | 196 11 501 | | 9/1997 |
| DE | 198 24 071 | | 12/1999 |
| EP | 0 096 841 A1 | | 12/1983 |
| EP | 0 960 923 A1 | | 12/1999 |
| EP | 1076081 A1 | * | 2/2001 |
| GB | 1067568 | | 8/1964 |
| JP | 56-30481 | | 3/1981 |
| WO | WO 94/24221 | | 10/1994 |

OTHER PUBLICATIONS

D. Satas, Handbook of Pressure Sensitive Adhesive Technology, 1999, Satas & Associates, Third Edition, p. 616.*
Patent Abstracts of Japan, Publication No. 06192634, Dec. 7, 1994; Nitto Denko Corp.

* cited by examiner

*Primary Examiner*—Monique R. Jackson
(74) *Attorney, Agent, or Firm*—Norris McLaughlin & Marcus PA

(57) ABSTRACT

A self-adhesive tape comprising an oriented polyolefin film, one side of which is coated with an adhesive layer formed from a mixture of 30-65 wt. % of a natural rubber latex and 35-70 wt. % of an aqueous dispersion of a hydrocarbon resin, and the opposite side of which has no surface treatment.

10 Claims, No Drawings

ADHESIVE TAPE HAVING ONE SIDE COATED WITH AN ADHESIVE, AND NO SURFACE TREATMENT ON THE OPPOSITE SIDE

This is a 371 of PCT/EP01/08745 filed 27 Jul. 2001 (international filing date).

The invention relates to an adhesive tape comprising a polyolefin-based backing unilaterally coated with a solvent-free adhesive based on natural rubber latex, and to the use of said adhesive tape as packaging tape.

BACKGROUND OF THE INVENTION

Adhesive tapes with films based on polyolefins, such as, for example, biaxially oriented polypropylene, and adhesive compositions based on solvent-containing natural rubber or aqueous acrylate dispersions are known and are supplied by known manufacturers.

A description is given, for example, in "Packaging Tapes" by Stefan Röber in Handbook of Pressure Sensitive Adhesive Technology, Third Edition, edited by Donatas Satas, Satas & Associates, Warwick, R.I. pp. 787-814. Further descriptions can be found in European Adhesives & Sealants 10(4), 1993, 29, by G. Pedala, and European Adhesives & Sealants 2(2), 1985, 18, by R. W. Andrew.

Owing to the known disadvantages associated with the production of solvent-containing adhesive tapes, such as, for example, the difficulty of recycling, solvents, the emission of solvent to the environment, the workplace hazard due to highly flammable solvents, and the restriction on coating speed imposed by the drying of the adhesive composition, solvent-free technologies for producing adhesive tapes are advancing in importance.

A disadvantage to add to the above-described problems of the solvent technology is the need to break down the natural rubber during the production of the adhesive composition, in a process known as mastication. This results in the adhesive composition having a cohesiveness which decreases markedly in accordance with the extent of breakdown under mechanical load.

The deliberate industrial process of breaking down rubber under the combined action of shear stress, temperature, and atmospheric oxygen is referred to in the technical literature as mastication and is generally carried out in the presence of chemical auxiliaries, which are known from the technical literature as masticating agents or peptizers, or, more rarely, as "chemical plasticizing aids". In rubber technology, the mastication step is heeded in order to make it easier to integrate the additives.

According to Römpp (Römpp Lexikon Chemie—Version 1.5, Stuttgart/New York: Georg Thieme Verlag 1998) mastication is a term used in rubber technology for the breaking down of long-chain rubber molecules in order to increase the plasticity and/or reduce the (Mooney) viscosity of rubbers. Mastication is accomplished by treating, in particular, natural rubber in compounders or between rolls at very low temperatures in the presence of masticating agents. The high mechanical forces which this entails lead to the rubber molecules being "torn apart", with the formation of macro-radicals, whose recombination is prevented by reaction with atmospheric oxygen. Masticating agents such as aromatic or heterocyclic mercaptans and/or their zinc salts or disulfides promote the formation of primary radicals and so accelerate the mastication process. Activators such as metal (iron, copper, cobalt) salts of tetraazaporphyrins or phthalocyanines permit a reduction in the mastication temperature. In the mastication of natural rubber, masticating agents are used in amounts from about 0.1 to 0.5% by weight in the form of masterbatches, which facilitate uniform distribution of this small amount of chemicals in the rubber mass.

Mastication must be clearly distinguished from the breakdown known as degradation which occurs in all of the standard solvent-free polymer technologies such as compounding, conveying, and coating in the melt.

Degradation is a collective term for different processes which alter the appearance and properties of plastics. Degradation may be caused, for example, by chemical, thermal, oxidative, mechanical or biological influences or else by exposure to radiation (such as (UV) light). Consequences are, for example, oxidation, chain cleavage, depolymerization, crosslinking, and/or elimination of side groups of the polymers. The stability of polymers toward degradation may be increased by means of additives: for example, by adding stabilizers such as antioxidants or light stabilizers.

The use of severely degraded adhesive compositions of this kind based on natural rubber hotmelt pressure-sensitive adhesives for adhesive tapes, especially packaging tapes, for sealing cartons made from recycled paper, or cardboard packaging, results in premature opening of the cartons. If there is sufficiently great tension across the lid of the carton, caused by the pressure of the packaged material in the carton or by the tension of the packaging material, which opposes sealing, the adhesive tape becomes detached from the surface of the carton and the carton opens as result of slippage of the packaging tape.

Adhesive packaging tapes for cardboard packaging, therefore, cannot be produced with an adhesive composition which is coated from nozzles and is based on natural rubber. The cohesion of such compositions is inadequate.

The cohesion and, with it, the packaging security afforded by adhesive tapes with an adhesive composition based on natural rubber may be improved either by crosslinking the rubber adhesive composition and/or by means of a variant preparation of the adhesive composition in the course of which the natural rubber used is broken down to a much-reduced extent and therefore has a higher molecular weight. This makes it possible to counter slippage of the adhesive tapes on the carton surface, as described above.

Solvent-free technologies for producing adhesive tapes, especially packaging tapes, have to date been restricted to the use of adhesive composition based on acrylate dispersions and to the use of melting, thermoplastic elastomers.

An advantage of these thermoplastic elastomers, predominantly block copolymers containing polystyrene blocks, is the relatively low softening point and the corresponding simplification of the application or coating process, and also the avoidance of the above-described disadvantages of the solvent-based technologies.

Further solvent-free systems based on aqueous adhesives, such as adhesive systems based on polyvinyl acetate, polyvinyl acetate-ethylene copolymers, neoprene, styrene-butadiene, polyurethane and polyvinyl alcohol, for example, are used little if at all owing to a costs and/or performance structure which is unfavorable for adhesive tapes, particularly packaging tapes.

An overview of the most important aqueous adhesive systems and also their use is given in "Solvent free adhesives", T. E. Rolando (H. B. Fuller) in Rapra Rev. Rep. 1997, 9(5), 3-30 Rapra Technology Ltd.

Various routes to the solvent-free preparation and processing of pressure-sensitive rubber adhesives are known.

An overview of such adhesive compositions and their use in the field of pressure sensitive adhesives (PSAs) is given in "Natural Rubber Adhesives" (G. L. Butler in Handbook of Pressure Sensitive Adhesive Technology, Third Edition, edited by Donata Satas, Van Nostrand Reinhold New York, pp. 261-287).

All of the known processes are characterized by very extensive rubber breakdown. For the further processing of the compositions for self-adhesive tapes, this necessitates extreme crosslinking conditions and also has the consequence of an application profile which is to some extent restricted, especially as regards the use of resultant self-adhesive tapes at relatively high temperatures. Solvent-free hotmelt PSAs based on nonthermoplastic elastomers, such as natural rubber or other high molecular weight rubbers, for example, lack sufficient cohesion for the majority of applications, in the absence of a step of crosslinking the adhesive composition, and are therefore unsuited to use in the context of an adhesive packaging tape. The reason for this failure of noncrosslinked adhesive compositions based on natural rubber is the relatively large reduction in molecular weight as a result of processing, and/or as a result of the preparation process of the adhesive compositions based on natural rubber, and the resultant reduced or inadequate cohesion of the adhesive compositions.

CA 698 518 describes a process for achieving production of a composition by adding high proportions of plasticizer and/or by simultaneously strong mastication of the rubber. Although this process can be used to obtain PSAs having an extremely high tack, the achievement of a user-compatible shear strength is possible only to a limited extent, even with a relatively high level of subsequent crosslinking, owing to the relatively high plasticizer content or else to the severe breakdown in molecular structure of the elastomer to a molecular weight average of $M_w \leq 1$ million.

The use of polymer blends, where besides nonthermoplastic natural rubber use is also made of block copolymers, in a ratio of approximately 1:1, represents essentially an unsatisfactory, compromise solution, since it results neither in high shear strengths when the self-adhesive tapes are used at relatively high temperatures nor in significant improvements on the properties described in CA 698 518.

Raw natural rubber latex is supplied from the plantations and is purified, preserved, and concentrated by means of appropriate methods. A general description of the types of latex and methods of processing is given in "Naturkautschuk—Technisches Informationsblatt" [Natural rubber—technical information sheet], Malaysian Rubber Producers Research Association, L1, 1977, and in "Kautschuktechnologie" [Rubber technology], Werner Hofmann, Gentner Verlag, Stuttgart p. 51 ff.

Natural rubber latex is harvested as a natural product from trees known as latex trees. After various processing steps for separation and purification, four basic types of natural, rubber lattices are distinguished:
1. Standard natural rubber latex with a high ammonia content of 0.7% by weight
2. Natural rubber latex with a low ammonia content of 0.2% by weight in combination with zinc oxide and tetramethylthiuram disulfide<0.035% by weight
3. Natural rubber latex doubly centrifuged, of particularly high purity
4. Natural rubber latex partly vulcanized, for specialty applications Mastication and the associated breakdown of the natural rubber is not necessary when preparing adhesive compositions based on natural drubber latex, since in the case of the solvent-free aqueous adhesive composition the simple mixing of the components is not accompanied by mastication and thus by a breakdown of the molecule under mechanical load. This results in a close interlooping of the natural rubber latex/isoprene molecules, a high molecular weight owing to absence of mastication, a broad molecular weight distribution, and a low softening point $T_g$.

These factors result in a very good balance between cohesion and adhesion in the adhesive composition resulting from resin blends, and also in a profile of properties which is of very high performance for adhesive tapes, over a very wide temperature range.

The preparation of aqueous adhesive compositions based on natural rubber latex is known. These adhesive compositions are used as described above for producing self-adhesive labels. This is done using the customary methods of preparing dispersion adhesives.

The preparation of adhesive composition systems which comprise natural rubber latex is likewise described in EP 0 960 923 A1. This discloses not only the preparation of dispersion adhesive compositions but also the incorporation of natural rubber latex into other natural rubber adhesive systems using compounders, mixers or extruders. The adhesive compositions prepared in this way may be coated onto film or nonwoven. An improvement in the packaging properties of such adhesive tapes by means of a controlled, enduring crosslinking of the adhesive composition, which also may be used as part of a rational production process, has hot been described.

When using adhesive composition variants based on natural rubber latex it is the case—as already set out above—that enduring crosslinking is unnecessary for achieving good packaging qualities that are superior to the majority of other adhesive composition systems.

Through the use of the above-described stabilizing resin dispersions and also by using natural rubber latex, and accordingly in the absence of any mechanical breakdown of the rubber whatsoever, it is possible to prepare, process, and apply adhesive compositions based on natural rubber latex and thus to produce adhesive tapes, since the adhesive composition possesses very high cohesion and hence optimum packaging security.

Not only for adhesive packaging tapes for sealing cartons but also for other adhesive packaging tapes, such as strapping tapes, therefore, the natural rubber-based adhesive composition must have sufficient cohesion.

These positive characteristics over a wide temperature range are exploited for the adhesive tape described in JP 56 030 481, comprising an adhesive composition based on natural rubber latex. Through the use of the natural rubber latex, a robustness to impact at low temperatures is described.

A further point is that natural rubber latex features a particularly wide spectrum of applications. Thus natural rubber latex is suitable on the one hand for use as an adhesive composition for packaging materials and on the other hand for applications outside of adhesive technology.

A disadvantage of adhesive composition systems based on natural rubber latex is the poor stability of the natural rubber latex raw material to mechanical load and the associated coagulation of the natural rubber latex in the adhesive composition. This sensitivity to shearing restricts the ease of handling and the usefulness of the natural rubber latex for adhesive composition technology and the adhesive tape industry. The production of adhesive tapes for which the adhesive composition comprising natural rubber latex can be coated at high speed onto a film is not known.

Through the use of stabilizing resin dispersions and/or surface-active substances, such as emulsifiers, for example, it is possible to increase significantly the stability of the natural rubber latex. However, increasing the stability of natural rubber latex using surface-active substances at high concentrations goes hand in hand with a loss of cohesion of the adhesive composition, with the consequence that an equal balance between stabilization and sufficient cohesion must be found.

The general use of natural rubber latex for adhesive compositions and also latex-stabilizing resin dispersions is described in "Tackified waterborne adhesive for PSA tapes", J. G. de Hullu, European Adhesives & Sealants, 12 (1998), p. 11-12. Through the use of such natural rubber latex-stabilizing resin dispersions, it becomes possible to process or coat adhesive compositions based on natural rubber latex. The trouble-free application of the dispersion adhesive compositions to a polymeric backing enables an industrially practicable and economically rational adhesive tape production process. The use of this technology is made possible by employing a suitable adhesive composition and by technically setting and optimizing the coating lines.

The application and development of an adhesive tape which unwinds quietly and is suitable for packaging applications has not been described in this context by J. G. de Hullu. The use of adhesive tapes with quiet unwind, particularly for carton sealing, however, is of great importance within the packaging industry in order to reduce the noise load in the packing houses and hence to increase work performance. The capacity for quiet unwinding is of fundamental importance in order to position an adhesive packaging tape within the middle to top price/performance segment.

Adhesive packaging tapes for carton sealing are applied manually or mechanically in the packaging industry. In this context, particularly in large packaging lines and halls, the quiet, non-clattering unwind behavior is an additional advantage of adhesive packaging tapes, in order to make working conditions more pleasant. This is an important quality feature for adhesive packaging tapes in Europe.

In the case of adhesive tapes which run out quietly, less than 80 dB (A) are measured at a distance of 25 cm, while loud adhesive packaging tapes which run out with clattering reach much higher dB(A) levels. This is described in "Noise Level Measurements, Internal Research Report, Beiersdorf AG".

Adhesive tapes presently on the market with a backing based on oriented polypropylene can be sub-divided into the following variants according to adhesive composition:
  adhesive tapes with an adhesive composition based on solventborne natural rubber (a)
  styrene-isoprene-styrene hotmelt PSAs (b)
  water-based acrylic dispersion (c)
(a) Polypropylene-based adhesive packaging tapes with an adhesive composition based on solventborne natural rubber run out quietly given an appropriate composition. A soft, flexible composition is necessary for this purpose. Usually, however, such adhesive tapes are provided with a solventborne carbamate coating in order to reduce the unwind force. The reverse-face coating results in the adhesive tape unwinding loudly with clattering.
(b) Polypropylene-based adhesive packaging tapes with an adhesive composition based on styrene-isoprene-styrene hotmelt PSAs can be used only in conjunction with a suitable reverse-face coating. Without reverse-face coating, owing to the chemical structure of the composition, the unwind force of the adhesive tape is so high that in the course of unwinding the backing becomes damaged and thus the packaging properties are severely impaired. The reverse-face coating, usually solventborne carbamate coatings, result in the adhesive tape unwinding extremely loudly and with clattering.
(c) Polypropylene-based adhesive packaging tapes with an adhesive composition based on water-based acrylates are used in combination with a corona treatment of the reverse face, the side of the backing remote from the adhesive composition. Without such corona treatment of the reverse face, these adhesive tapes run out loudly and with clattering. With appropriately adjusted corona treatment of the reverse face, it is possible to achieve quiet and clatter-free runout of the adhesive packaging tapes.

This is described in EP 0 096 841. By means of this corona treatment of the reverse face of the backing, carried out for example after coating during the slitting operation, the unwind force of the adhesive tapes is increased and hence flaking of the adhesive composition from the backing is prevented. This flaking of the adhesive composition from the backing as a result of the unwind operation leads to a loud, clattering unwind behavior. By means of the corona treatment of the reverse face to an appropriate extent, the adhesive tape acquires quiet unwind. In this case, by suitable corona treatment of the reverse face, the unwind force is adjusted and hence also the unwind behavior is set. Up until the present-day state of development, all adhesive tapes without reverse-face corona treatment unwind loudly.

The corona treatment of the adhesive tapes is accompanied substantially by disadvantages. First, it involves an additional workstep, which necessitates additional mechanical equipment. In the case of corona treatment during the slitting operation, only slitting machines with a slitting corona can be used. This necessitates in some cases the acquisition of additional machinery.

Second, the precise extent of the corona treatment is critical to obtaining the desired effect. This brings with it a large degree of operational uncertainty, necessitating increased quality control.

In the case of an inadequate corona output, the desired effect of quiet unwind is not adequately fulfilled, since the resultant finished adhesive tapes cannot be after treated, the production of reject product is the consequence. In the case of an excessive corona output, the unwind force becomes increased excessively, resulting in backing overstretch, tearing of the backing, or transfer of the adhesive composition during the unwinding of the adhesive tape.

Adhesive packaging tapes with a backing based on oriented polypropylene and an adhesive composition based on a water-based adhesive composition, which unwind quietly, without treatment of the side of the backing remote from the adhesive, by corona treatment for example, are not known and are not prior art.

Adhesive packaging tapes with an adhesive composition based on natural rubber latex are therefore able to unify the advantages of a water-based adhesive composition with the absence of the reverse-face corona, which is no longer necessary, and yet still represent adhesive tapes which run out quietly and without clatter.

In general terms, natural rubber latex is a known component of adhesive compositions and is described, inter alia, in patents. The fields of use of such adhesive compositions based on natural rubber latex are applications in the sector of labels and plaster technology.

Monoaxially and biaxially oriented films based on polypropylene are used in large quantities for adhesive packaging tapes. Whereas for the use of an adhesive packaging tape for carton sealing preference is given to biaxially oriented films based on polypropylene, monoaxially oriented polypropylene films are used in the strapping tapes segment. They are notable for very high tensile strength and low elongation in the longitudinal (machine) direction and are extremely suitable for the purpose of bundling and for holding pallets together. Where adhesive compositions are used which lack adequate cohesion or adequate anchoring of the adhesive composition on the film, slippage of the strapping tapes leads to slipping of the pallets and hence to inadequate securement of the pallets. Insufficient anchoring of the adhesive composition on the film leads, in the case where carton sealing tapes are used, to premature opening of the packed cartons.

Thermoplastic films based on polyvinyl chloride (PVC) are used to produce adhesive tapes by a variety of manufacturers. Particularly films based on PET are distinguished by high elongation at break and thermal stability of from 130° C. to 175° C., and resistance toward dilute alkalis and acids. Moreover, films based on polyesters possess a very high abrasion resistance and penetration resistance, but are less widespread in the field of adhesive packaging tapes owing to their relatively high price in relation to polyolefin-based films.

In the production of adhesive tapes with adhesive compositions based on natural rubber, both water-based and solventborne primers are used as adhesion promoters between adhesive composition and backing film. These adhesion promoters that are used possess in part a crosslinking effect on the natural-rubber-based adhesive composition which is applied from solution.

It is an object of the present invention to provide adhesive tapes having films based on oriented polyolefins and solventlessly prepared, water-based adhesive compositions based on natural rubber latex which exhibit quiet unwind behavior without the need to use corona treatment to activate the side of the adhesive tape backing that is opposite the adhesive composition.

Moreover, the intention is that the adhesive tapes should unwind quietly. Furthermore, the novel adhesive tapes should be outstandingly suitable as adhesive packaging tapes for commercial cardboard packaging.

SUMMARY OF THE INVENTION

The invention accordingly provides an adhesive tape self-adhesively coated on one side, comprising a film based on oriented polyolefins, the side of the film remote from the adhesive layer having no surface treatment.

The film is provided on one side with an adhesive layer, prepared from a mixture comprising
  from 30 to 65% by weight of a natural rubber latex
  from 35 to 70% by weight of an aqueous resin dispersion based on a hydrocarbon resin.

DETAILED DESCRIPTION

Films which can be used in accordance with the invention include monoaxially and biaxially oriented films based on polyolefins, viz. films based on oriented polyethylene or oriented copolymers containing ethylene and/or propylene units.

Monoaxially oriented polypropylene is notable for its very high tensile strength and low elongation in the longitudinal (machine) direction and is used, for example, to produce strapping tapes. For producing the adhesive tapes of the invention, especially for the purpose of bundling and palletizing cardboard packaging and other goods, particular preference is given to monoaxially oriented films based on polypropylene.

The thicknesses of the monoaxially oriented films based on polypropylene are preferably between 25 and 200 µm, in particular between 40 and 130 µm.

Monoaxially oriented films are predominantly single-layer, although in principle multi-layer monoaxially oriented films can also be produced. The majority of the known films are one-, two-, and three-layer, although the number of layers chosen may also be greater.

Additionally particularly preferred for producing the adhesive tapes of the invention, which are used, i.e. for secure carton sealing, are biaxially oriented films based on polypropylene having a draw ratio in the machine direction (MD) of between 1:4 and 1:9, preferably between 1:4.8 and 1:6, and a draw ratio in the transverse (cross) direction (CD) of between 1:4 and 1:9, preferably between 1:4.8 and 1:8.5.

The moduli of elasticity achieved in the machine direction, measured at 10% elongation in accordance with ASTM D882, are customarily between 1000 and 4000 N/mm$^2$, preferably between 1500 and 3000 N/mm$^2$.

The thicknesses of the biaxially oriented films based on polypropylene are in particular between 15 and 100 µm, preferably between 20 and 50 µm.

Biaxially oriented films based on polypropylene may be produced by means of blown film extrusion or by means of customary flat film units. Biaxially oriented films are produced both with one layer and with a plurality of layers. In the case of the multi-layer films the thickness and composition of the different layers may also be the same, although different thicknesses and compositions are known.

Particularly preferred for the adhesive tapes of the invention are single-layer, biaxially or monoaxially oriented films and multi-layer biaxial or monoaxial films based on polypropylene which have a sufficiently firm bond between the layers, since delamination of the layers in the course of application is disadvantageous.

The adhesion of the adhesion promoter to the thermoplastic film based on polyolefins can be improved by corona treatment or flame pretreatment, since the surfaces of films based on oriented polyolefins in particular can be treated by means of these widely known processes, such as corona or flame treatment. Surface treatments by means of corona treatment are preferred.

An overview of the methods of surface treatment is contained, for example, in the article "Surface pretreatment of plastics for adhesive bonding" /A. Kruse; G. Krüger, A. Baalmann and O. D. Hennemann; J. Adhesion Sci. Technol., Vol 9, No 12, pp 1611-1621 (1995).

The biaxially oriented films for the adhesive tapes of the invention are corona- or flame-pretreated on the side facing the composition or facing the adhesion promoter, where present, but are not surface-treated and/or corona- or flame-pretreated on the side remote from the composition.

In a further preferred embodiment of the invention, an adhesion promoter is present between the optionally flame- or corona-treated film and the adhesive layer, and guarantees the effective bonding of the adhesive composition to the film and the crosslinking of the adhesive.

The optionally used adhesion promoter between adhesive composition and backing film optimizes the bond between the layers mentioned.

The application rate of the adhesive layer is in particular from 10 to 45 g/m$^2$. In one preferred version, the application rate set is from 13 to 28 g/m$^2$.

In one particularly preferred variant, the adhesives of the adhesive tapes of the invention include from 45 to 60% by weight of natural rubber latex. Also in accordance with the invention are other natural rubber latices and also mixtures of different types of natural rubber latices.

Depending on application, the following components—chosen independently of one another—may be added to the adhesive:
a) from 0.1 to 5% by weight of an aging inhibitor,
b) from 0.05 to 5% by weight of a defoamer,
c) from 0.05 to 4% by weight, in particular from 0.3 to 3% by weight, of an alkoxylated alkylphenol,
d) from 0.05 to 20% by weight of at least one color pigment.

With further preference, the adhesive layer contains up to 20% by weight of at least one resin dispersion based on hydrocarbon resins having a softening point of from 20° C. to 85° C.

The adhesive may in particular include from 0.05 to 20% by weight and, preferably, from 2 to 15% by weight of the additional resin dispersion.

The raw material used for the adhesive tapes of the invention is preferably standard natural rubber latex with an ammonia content of 0.7% by weight, firstly because the natural rubber latex mentioned offers price advantages and secondly because its relatively high ammonia content provides the natural rubber latex with effective stabilization. Substantially, natural rubber latex is very highly suitable for the use of adhesive compositions for adhesive tapes. Owing to the latex's very high molecular weight, the interlooping of the molecule chains, low glass transition temperature, and absence of mastication during the preparation of the adhesive compositions, adhesive compositions based on natural rubber latex display an excellent balance between adhesion and cohesion.

Through the use of adhesive compositions based on natural rubber latex, in other words water-based natural rubbers, there is no kind of mechanical degradation of the rubber. The adhesive compositions are therefore distinguished by excellent cohesion.

These properties ensure a very high level of packaging security when adhesive tapes comprising a natural rubber latex-based adhesive composition are used, especially in connection with the use of critical carton types and low temperatures.

The mechanical stability of the natural rubber latex may be critical with regard to mechanical shearing loads. Strong mechanical shearing loads lead to coagulation of the natural rubber latex, meaning that it cannot be processed. Possibilities for stabilizing the adhesive compositions based on natural rubber latex toward mechanical loads include firstly the use of appropriate stabilizing resin dispersions and secondly the use of emulsifiers.

The adhesive tapes of the invention preferably comprise natural rubber latex at between 30% to 65% by weight of the standard natural rubber latex with a high ammonia content.

The solids content is preferably between 50% by weight and 55% by weight.

Aqueous resin dispersions, i.e., dispersions of resin in water, are known. Their preparation and properties are described, for example, in "Resin Dispersions", Anne Z. Casey in Handbook of Pressure Sensitive Adhesive Technology, Second Edition, edited by Donatas Satas, Van Nostrand Reinhold New York, pp. 545-566.

Dispersions of hydrocarbon resins are likewise known and are offered, for example, by Hercules BV under the trade name Tacolyn.

For the adhesive tapes of the invention, resin dispersions based on hydrocarbon resins or modified hydrocarbon resins as principal resin component are used. The adhesive comprises between 35 to 70% by weight of the resin dispersion and preferably between 40 to 55% by weight of the resin dispersion. The solids content of the resin dispersion is in particular between 40 and 70% by weight, preferably between 45 and 60% by weight.

Also in accordance with the invention is the use of resin dispersions based on mixtures of different hydrocarbon resins and also on mixtures of inventive hydrocarbon resins with other resins.

Likewise known are resin dispersions based on modified hydrocarbons, and of particular interest in this context are C5/C9 hydrocarbon resin dispersions which have been modified with aromatics. The polarity of the resin dispersion and thus of the adhesive composition may be adjusted by way of the proportion of aromatics. As well as the polarity of the adhesive composition, the hardness of the resin is influenced. The lower the aromatics content, the lower the polarity of the modified hydrocarbon resin dispersion.

Aging inhibitors for adhesives based on natural rubber are known. Three different kinds of aging inhibitor are used in particular as antioxidants for adhesives: aging inhibitors based on amines, on dithiocarbamates, and on phenols. Phenol-based aging inhibitors are very effective under the influence of UV radiation and sunlight.

For the adhesive tapes of the invention, phenol-based aging inhibitors are used. The adhesive comprises in particular from 0.1 to 5% by weight of an aging inhibitor based on phenols. Also in accordance with the invention is the use of other types of aging inhibitor, such as aging inhibitors based on amines and dithiocarbamates, for example.

Organic and inorganic pigments for adhesives based on natural rubber are known. For the coloring of adhesives based on natural rubber, use is made in particular of titanium dioxide or of titanium dioxide in combination with different-colored color pigments. For the adhesive tapes of the invention, suitable organic and/or inorganic color pigments are used in dispersion form. The adhesive preferably comprises from 0.05 to 20% by weight of an organic and/or inorganic color pigment. Also in accordance with the invention is the use of pigments based on mixtures of different organic and inorganic pigments.

The use of alkoxylated alkylphenols as plasticizers is proposed, inter alia, in "Modification of Acrylic Dispersions", Alexander Zettl in Handbook of Pressure Sensitive Adhesive Technology, Second Edition, edited by Donatas Satas, Van Nostrand Reinhold New York, p. 471. The properties of the alkoxylated alkylphenols are determined by the alkyl radical and predominantly by the structure of the polyglycol ether chain. In one preferred version, propoxylated alkylphenol is used. Water-soluble alkoxylated alkylphenols are preferred.

The use of alkylphenol polyglycol ethers as emulsifiers for stabilizing the natural rubber latex dispersion adhesive composition is proposed, inter alia, in "Compounding Natural Latex in water-based PSAs", Richard C. Oldack and Robert E. Bloss in Adhesive Age, April 1979, pp. 38-43.

The properties and the stabilizing effect of the alkoxylated alkylphenols or, generally, of the polyethyleneoxyethanolate condensates are determined predominantly by the polyglycol ether chain. A correlation has been found in this context between the length of the polyglycol ether chain and the stabilizing effect on natural rubber latex.

The adhesives of the invention may comprise from 0.05 to 5% by weight of alkoxylated alkylphenol, in one preferred version from 1 to 3% by weight.

On unwinding at a distance of 25 cm from the center of the adhesive tape roll at an unwind speed of 45 m/min the adhesive tape gives rise to a noise level of less than 80 dB (A).

The adhesive tapes of the invention may be produced by the known methods. An overview of customary production methods can be found, for example, in "Coating Equipment", Donatas Satas in Handbook of Pressure Sensitive Adhesive Technology, Second Edition edited by Donatas Satas, Van Nostrand New York, pp. 708-808. The known methods of drying and slitting the adhesive tapes are likewise to be found in the Handbook.

The adhesive tapes of the invention are suitable for a large number of adhesive tape applications. One important field of application is that of packaging applications. The adhesive tapes are suitable for use as carton sealing tapes, general adhesive packaging tapes, strapping tapes, and adhesive tapes for sealing plastic packaging and plastic bags. The adhesive tapes are suitable for pallet securement. Further applications are the bundling of loose goods and goods for transit, such as pipes, planks, etc. The adhesive tapes of the invention may be used to secure, for example, refrigerators and other electrical and electronic appliances when in transit. Further applications include label protection, surface protection, in the construction sector, for example, and tear-open strips for packaging. Applications within the office sector are also possible. The adhesive packaging tapes have running lengths in particular of 66, 100 and 1 000 m. Common roll widths chosen are 18, 24, 36, 48, 50 and 72 mm.

The preferred colors are brown, white, and transparent. Printing is carried out on rolls 144 or 150 mm in width, which are then again slit to the above mentioned widths.

It should be emphasized again that there is no need to use corona pretreatment to activate the side of the adhesive tape backing that is opposite the adhesive composition. Accordingly, an additional, technically complex process step is omitted, which The intention of the text below is to illustrate the invention, with reference to examples, without wishing unnecessarily to restrict the invention.

EXAMPLES

Example a

Film

A biaxially oriented film based on polypropylene from Radici is used.

| | |
|---|---|
| Film thickness | 28 μm |
| Identification | Radil T |
| Company/manufacturer | Radici SpA |
| Elongation at break, MD | 130% |
| Elongation at break, CD | 50% |
| Elasticity modulus, MD | 2500 N/mm$^2$ |
| Elasticity modulus, CD | 4000 N/mm$^2$ |

The surface energy of the untreated BOPP film Radil T25 is less than 30 mN/m. The surface energy of the polypropylene surface coated with adhesion promoter is from 44 to 46 mN/m after corona treatment.

The surface energy of the untreated polypropylene surface of the film Radil T25 is less than 30 mN/m. This is the side of the film opposite the adhesive composition.

Example b

Components

Components used:

| | |
|---|---|
| b1 | of the adhesive composition |
| b1.1 | natural rubber latex obtainable from Weber & Schaer, Hamburg; (solids content 60%) |
| b1.2.1 | aqueous resin dispersion based on hydrocarbon resins (from Hercules BV, Tacolyn 1070, solids content 55% by weight; softening point 70° C.) |
| b.1.3 | aging inhibitor AD112 from Synthomer GmbH, Frankfurt |
| b1.4 | defoamer Foammaster 306 from Henkel, Düsseldorf |
| b2 | of the primer |
| b2.1 | Trapylen 6965W (polypropylene dispersion with low degree of chlorination, from Tramaco, Hamburg) or Butofan LS103 (styrene-butadiene dispersion from BASF) |

Example c

Formulations c1 formulation A of the adhesive

The formulation is given in % by weight:

| | |
|---|---|
| Natural rubber latex dispersion | 52% by weight |
| Tacolyn 1070 | 47% by weight |
| Aging inhibitor | 0.7% by weight |
| Defoamer | 0.3% by weight | c2 formulation B of the primer

The formulation is given in % by weight:

| | |
|---|---|
| Trapylen 6965W | 100% by weight |
| or | |
| Butofan LS103 | 100% by weight |

Example d

Preparation of the Adhesive and of the Primer

The adhesive A to be coated is prepared as follows:

d1 the resin dispersion is added to the natural rubber latex at 23° C. with continual stirring with a customary mechanical stirrer. This is followed by careful stirring for 15 minutes more.

d2 the aging inhibitor and the defoamer are stirred carefully into the mixture from step 1 (d1). Stirring is then continued for 15 minutes. This is followed by coating.

The adhesive B to be coated is prepared as follows:

d3 Trapylen 6965W and Butofan LS103 are mixed and used without further pretreatment.

Example e

Coating

The film a is coated with the primer formulation B and with the adhesive formulations A and B by means of a wire doctor. In a first step the primer is applied, and briefly dried at from 80 to 90° C., and directly thereafter in a second step (inline or offline) the adhesive is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 100° C.). The coated film was processed in a width of 50 mm and a length of 60 m.

The technical adhesive data are determined following storage at 23° C. for two days and following storage at 23° C. for from one to three months.

Example f

Results

The test methods used are briefly characterized below:

To determine the adhesive application rate, a circular specimen of known surface area is cut from the coated film and weighed. The adhesive composition is then removed using petroleum spirit and the film, now free of adhesive composition, is weighed again. The adhesive application rate, in g/m², is calculated from the difference.

To characterize the tack with respect to cardboard, the adhesive tape is applied to the cardboard using a standard commercial manual roller and is pressed on using a steel roller weighing 2 kg (overrolling twice). After a waiting time of 3 minutes, the adhesive tape is peeled off parallel at a speed of about 30 m/min and at an angle of approximately 130° to the cardboard surface. The tack with respect to cardboard is assessed qualitatively on the basis of the amount of paper fibers torn out, in comparison with a standard commercial adhesive packaging tape such as tesapack 4124 from Beiersdorf, whose tack is characterized very well.

To determine the packaging security a standard carton (dispatch carton; 425 mm×325 mm×165 mm: length× breadth×height: from Europakarton; constructed from bicorrugated cardboard with a 125 g/m² kraftliner outer ply) is sealed with the adhesive tape using a standard commercial automatic packer (Knecht, model 6030 and sealing unit 6230, setting without braking path). The adhesive tape is applied centrally in a standard U-shaped seal so that 60 mm of adhesive tape are bonded at each of the end faces. Before sealing, the carton is completely filled with peas and is stored lying, on its side face at 40° C. and at 23° C. The packaging security is characterized as being very good if the carton remains sealed for more than 30 days. Also characterized and described are the slippage of the adhesive tape on the carton and, respectively, the behavior of the adhesive tape at the bonded areas, and these qualities are compared with the reference adhesive tape (table 1).

The unwind noise is determined with the adhesive tape being unwound at a speed of 45 m/min. The unwind noise is measured in dB (A) at a distance of 25 cm from the center of the roll of adhesive tape, using a standard commercial sound level meter from Brüel & Kjear (type 2226). A measured sound level less than 80 dB (A) is classed as quiet.

The unwind force is measured at constant unwind speed (30 m/min) by measuring the torque and calculating the unwind force, in N/cm, in accordance with the known formulae.

The results of the investigation of an inventive adhesive tape with unembossed film and its assessment in relation to comparative adhesive tapes are given in table 1.

TABLE 1

Characteristics of the adhesive tapes of the invention

| Structure/ storage time/ temperature | Sample A | Sample B tesa 4024 with reverse-face corona | Sample C tesa 4024 without reverse-face treatment | Sample D tesa 4089 with reverse-face coating |
|---|---|---|---|---|
| Adhesive | Adhesive A | acrylate dispersion | acrylate dispersion | solventborne natural rubber composition |
| Backing | Film a | Film a | Film a | Film a |
| Primer | formulation B | no primer | no primer | standard primer |
| Adhesive application rate [g/m²] | 18-22 | 24 | 24 | 20 |
| Application rate, primer layer [g/m²] | 0.8 | — | — | 0.6 |
| Surface tension, reverse face | ~30 mN/m | ~36-38 mN/m | ~30 mN/m | carbamate coating |
| Anchoring of adhesive | good | good | good | good |
| Unwind behavior [loud/quiet] | quiet | quiet | loud | loud |
| Unwind force at 30 m/min [N/cm] | 3.3 | 4.5 | 1.5 | 0.7 |
| Packaging security | very good | good | good | good |
| Tack on cardboard | good | very good | very good | good |

Sample A: sample of the adhesive tapes of the invention without reverse-face corona

We claim:

1. An adhesive tape self-adhesively coated on one side, comprising
    a. an oriented polyolefin film, the side of the film remote from the adhesive layer having no surface treatment,
    b. an adhesive layer applied to one side of the film, formed from a mixture comprising
        from 30 to 65% by weight of a natural rubber latex
        from 35 to 70% by weight of an aqueous resin dispersion of a $C_5/C_9$ hydrocarbon resin
    which, on unwinding at a distance of 25 cm from the center of an adhesive tape roll at an unwind speed of 45 m/mm, gives rise to a noise level of less than 80 dB (A).

2. The tape as claimed in claim 1, wherein the film has a thickness of between 20 and 50 μm.

3. The tape as claimed in claim 1 wherein the film comprises one or more layers of monoaxially oriented polypropylene films or has a film thickness of between 25 and 200 μm, or both.

4. The tape as claimed in claim 3, wherein said film has a thickness of between 40 and 130 μm.

5. The tape as claimed in claim 1, having a layer of a primer between the film and the adhesive layer.

6. The tape as claimed in claim 1, wherein the application rate of the adhesive layer to the film is from 10 to 45 g/m².

7. The tape as claimed in claim 1, wherein the adhesive layer contains up to 20% by weight of at least one resin dispersion wherein the dispersed resin is selected from the group consisting of hydrocarbon resins having a softening point of from 20° C. to 85° C.

8. The tape as claimed in claim 1, wherein the adhesive layer contains
   from 0.1 to 5% by weight of an aging inhibitor,
   from 0.05 to 4% by weight of an alkoxylated alkylphenol,
   from 0.05 to 5% by weight of a defoamer and/or
   from 0.05 to 20% by weight of at least one color pigment.

9. The tape as claimed in claim 8, wherein the amount of said alkoxylated alkylphenol is from 0.3 to 3% by weight.

10. A method of sealing cartons, which comprises sealing said cartons with the adhesive tape of claim 1.

* * * * *